Jan. 5, 1971  E. MARECHAL  3,551,995
CLADDING HEADERS HAVING TUBES ATTACHED THERETO
Filed Jan. 4, 1968  3 Sheets-Sheet 1

*INVENTOR.*
EMILE MARECHAL

United States Patent Office 3,551,995
Patented Jan. 5, 1971

3,551,995
CLADDING HEADERS HAVING TUBES
ATTACHED THERETO
Emile Marechal, Lille, France, assignor to Societe Fives
Lille-Cail, Paris, France
Filed Jan. 4, 1968, Ser. No. 695,713
Claims priority, application France, Jan. 4, 1967,
89,878; Mar. 2, 1967, 97,117; Oct. 2, 1967,
122,928
Int. Cl. B23k 31/02
U.S. Cl. 29—471.3
15 Claims

ABSTRACT OF THE DISCLOSURE

Tubes are inserted into the bores of a header to be joined thereto, and the outer face of the header is surfaced or clad after the ends of the tubes have been plugged. The surfacing or cladding is applied by any suitable welding process, and if it extends over the tube ends, the tubes are simultaneously welded to the header.

BACKGROUND AND SUMMARY OF THE INVENTION

The present invention relates to surfacing or cladding tubular headers by welding.

In heat exchangers, for instance, a great number of parallel tubes are attached at one of their ends to a header which has a corresponding number of bores wherein the tubes are inserted. Conventionally, the tube ends have been welded to the header by annular welds following the circumference of the tubes. This process is very time-consuming, the welds are not uniform and homogeneous, automatic welding is very difficult, and the spacing between adjacent tubes must be large enough to make the application of the individual annular welds possible.

It is the primary object of the present invention to overcome these and other disadvantages, and to provide a rapid and economical process of surfacing headers while joining the tube ends thereto.

The process of the invention is particularly advantageous if the header face requires surfacing or cladding to protect it from erosion, for instance, or to recover a worn header face. In such case, a protective cladding may be applied by welding while joining the tube ends to the header. Any conventional welding process, including arc welding or welding under flux, which is suitable to a given header may be used in the process of this invention.

In summary, this process consists of inserting one end of the tubes into respective ones of the header bores, with the tube ends extending at least close to the outer heater face, plugging the ends of the tubes to prevent welding metal from entering into the tube bores, welding a surfacing or cladding to the outer header face, and unplugging the tube ends. If any of the surfacing obstructs the tube bores, the bores are reamed to remove any such surfacing material.

The specific surfacing material will depend on the desired purpose, and any material which is conventionally used in welding may be used.

BRIEF DESCRIPTION OF DRAWING

The above and other objects, features and advantages of the present invention will become more apparent in the following detailed description of certain preferred embodiments thereof, taken in conjunction with the accompanying drawing wherein.

DETAILED DESCRIPTION

In assembling a heat exchanger, for instance, which has a great number of parallel tubes with ends attached to a corresponding number of bores in a header, the tube ends are first inserted into respective ones of the header bores, either flush with the outer header face or extending slightly above or below the header face. Thus, in FIGS. 1–3, the end of tube 12 is shown inserted into a conforming bore in header 10, flush with the outer face 10' of the header. In accordance with the present invention, the tube end is closed with a plug.

Figure 1:
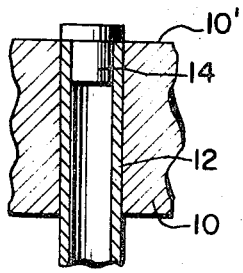
FIGS. 1, 2 and 3 are side views, partly in section, showing three types of plugs inserted into a tube attached to a header which is to be surfaced or clad in accordance with this invention.

In the embodiment of FIG. 1, the stopper or plug 14 is preshaped of a metal which is fusible under the welding conditions used to surface or clad the outer face of the header in a manner to be described hereinafter. As shown, the plug has a cylindrical portion fitting tightly into the open tube end and a rim portion engaging the outer end of the tube and thus sitting on the tube. Since the plug is arranged in the open tube end to prevent fused metal from passing through the tube end into the interior thereof, it is essential that the cylindrical portion of the plug 14 is long enough to prevent melting of the inner end of this portion during soldering if the plug is made of a metal which fuses under the soldering conditions. Of course, if desired, the plug may be made of a material which does not melt under these conditions. A preferred material of this type is a borosilicate glass, such as "Pyrex" glass. Borosilicate glass does not adhere to the weld while it well supports the weld metal. Thus, after the welding strip has been applied according to the invention to surface or clad the outer header face, the plug may be readily fractured and thus removed by a mechanical blow, leaving the tube end free of any obstruction after the surfacing operation has been completed without the necessity of reaming the tube end.

Other useful plug materials which do not melt under the soldering conditions are copper, tungsten, gravel, quartz and like refractory materials.

Figure 2:
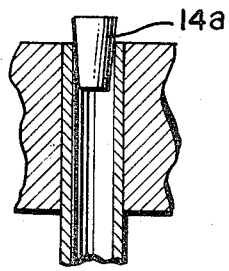

FIG. 2 shows another type of plug, the plug 14a being of frustoconical shape so that it will remain supported in the open tube end during the soldering operation.

Figure 3:
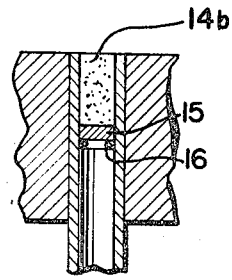

In the embodiment of FIG. 3, the plug consists of a metal disc 15 held in place in the tube end by an annular clip 16 and supporting a charge of welding flux and weld metal powder 14b.

After the open tube ends have been plugged in the indicated manner, the outer face of the header is surfaced or clad and the tube ends are simultaneously welded to the header in a manner to be described hereinafter.

Figure 4:
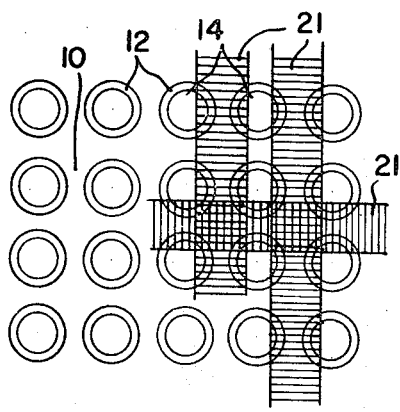
FIGS. 4 and 5 are top views of the outer face of a header, illustrating two modifications of surfacing or cladding the outer face.
Figure 5:
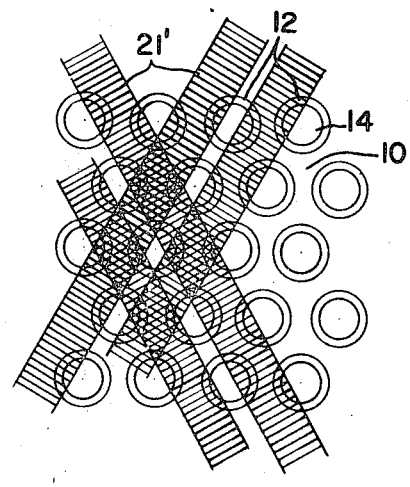

FIGS. 4 to 7 illustrate modifications of the surfacing process by means of automatic arc welding. As shown in FIGS. 4 and 5, the cladding may be applied in a succession of parallel welding strips 21 or 21' to cover the header face areas between the tubes 12 and also the outer ends of the tubes so as to join the tube ends to the header by these welding strips.

In the embodiment of FIG. 4, the two series welding strips 21 extend at right angles to each other, the header bores also being arranged in series of rows at right angles to each other. In the embodiment of FIG. 5, alternate rows of header bores are laterally staggered, and the two series of welding strips 21' accordingly extend at an angle to each other to conform to the pattern of the header bores and so as to extend over the outer header face areas between the tubes 12.

Figure 6:
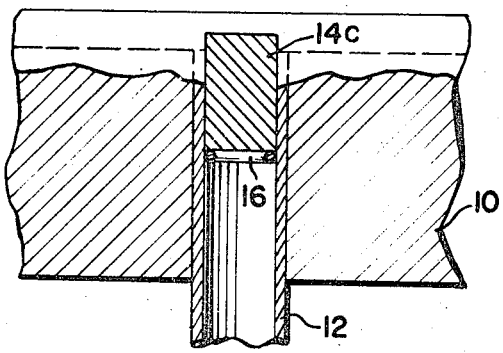
FIGS. 6 and 7 are side views, partly in section, of two modifications, showing a portion of the header after surfacing.

The methods of arc welding successive strips of cladding to the header face will be particularly useful if only a thin coating is desired. As shown in FIG. 6, this coating may entirely cover the plug inserted into the tube end when the welding strips are wide enough to lie side-by-side in contact with each other. This will require subsequent removal of the cladding material over the area of the plug and removal of the plug to reopen the tube ends. On the other hand, if the welding strips are arranged in the manner indicated in FIGS. 4 and 5 so as to cover substantially only the square or rhombic areas between the tubes, the plug will remain uncovered, as shown in FIG. 7, although all of the outer face of the header and the outer ends of the tubes will be covered by the welding strips, thus joining the tubes to the header.

Figure 7:
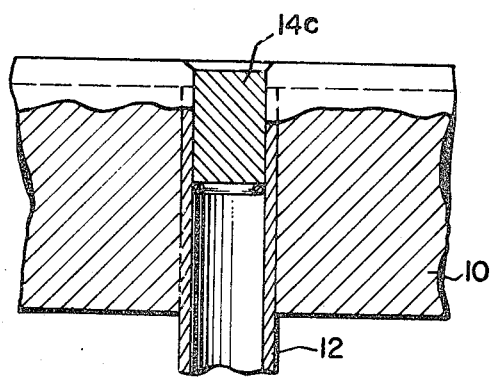

The plug 14c of FIGS. 6 and 7 differs slightly from those of FIGS. 1–3 in that it consists solely of a cylindrical portion and is held in place in the tube end by an annular clip 16. As shown, the plugs 14c extend slightly beyond the outer header face.

Any of the many conventional arc welding methods may be used to form the welding strips described hereinabove. If parallel welding strips all extending in the same direction are applied, twin arc welding may be used, for instance. If the welding strips are to be applied in two directions, as shown in FIGS. 4 and 5, one may operate with a single electrode rod or with two electrode rods positioned on either side of a row of tubes. Suitable welding methods will readily occur to those skilled in the art, and the present invention is not limited to, or concerned with, specific welding methods per se.

If it is difficult to place the header in any but the vertical position, it may be preferred to weld under flux to surface or clad the outer header face. One embodiment of such a process is shown in FIG. 8.

In this case again, the tube ends are plugged with any material which will prevent a bath of welding metal and flux from penetrating into the tubes 12. If desired, the plug may consist of a welding metal power and flux bonded together into a solid plug and supported by a metal disc, such as shown in FIG. 3.

Figure 8:
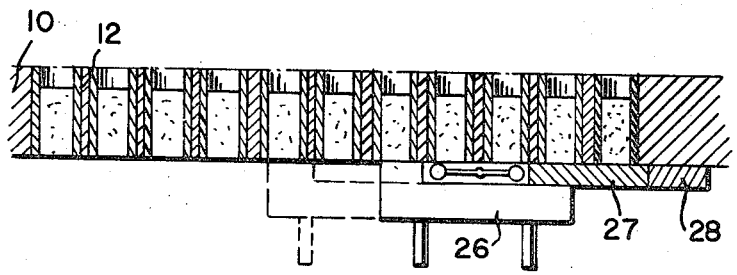
FIG. 8 illustrates an embodiment of the process of surfacing or cladding a header by welding under flux.
Figure 9:
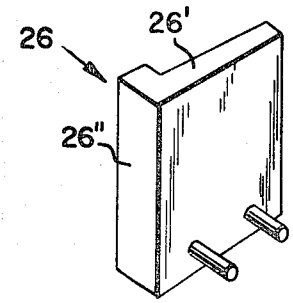
FIG. 9 is a perspective view of the block used in the process shown in FIG. 8.
Figure 10:
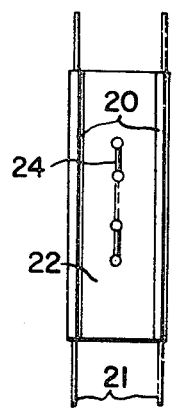
FIG. 10 is a top view of a fusible metal rod used in the welding process of FIG. 8.

A method of welding, as used according to FIGS. 8–10, is fully described in French Patent No. 1,230,048 whose disclosure is herewith incorporated into the present specification. In this method, the welding rod is constituted by two electrode wires 21, 21 of a fusible weld metal held within the tubular edges 20, 20 of a stiffening plate 22 of a flux material. An asbestos strip 24 disposed in zig-zag formation on both sides of the plate 22 serve to insulate the electrode wires. The asbestos strips may, of course, be replaced by other insulation. Welding strips are formed on the vertical outer face of header 10 with the aid of a container 26 for the weld bath.

As most clearly shown in FIG. 9, the container comprises an upright wall portion 26' and a lower ledge portion 26'' designed to contact the outer header face during operation so as to form an L-shaped container defining a space between the upright wall portion and the outer header face wherein the welding rod is placed, as shown in FIG. 8. The container 26 may be of copper, for instance, and is cooled by water circulating through its hollow interior so as to aid in the rapid solidification of the welding strips formed.

First, an iron strip 28 of the same thickness as the desired cladding is welded to an edge portion of the outer face of header 10. Then, the container 26 is held in place with its lower ledge 26'' in contact with the outer face of the header and the upright wall portion 26' in contact with the iron strip 28 so as to form an interspace accommodating the weld rod extending along the entire length of the desired welding strip to be formed in the container. Welding is then initiated by forming an arc, and the container is moved gradually from spot to spot along the outer face of the header as the weld rod melts and the formed strip of weld metal solidifies, thus no longer requiring the support of container 26. The asbestos strip 24 properly centers the weld rod in the container, and the container is automatically moved along by a machine (not shown), such as illustrated in the above-mentioned French patent. After the strip 27 has thus been formed, the container 26 is moved into the position shown in full lines in FIG. 8, with its upright wall portion supported by the strip 27. The adjacent strip is then formed in the same manner, and the container is then moved into the successive position shown in broken lines in FIG. 8, this procedure being repeated until the entire outer face of the header has been surfaced or clad.

If desired, the welding device shown in FIG. 10 may be replaced by simple welding tubes insulated in asbestos covers or glass wool covers, or simply by insulation similar to that used for electrodes in arc welding. It is emphasized again that the present invention is not concerned with specific welding techniques and that all such techniques, which are suitable to provide the cladding of the present invention, may be used and are encompassed within the scope of this invention.

If the dimensions of the header face permit and a sufficiently large container 26 is used, the entire outer face of the header may be surfaced or clad in a single operation by placing several weld rods side by side in the container. Conventional machines for welding under flux may also be used for forming the welding strips according to the invention, with containers suitably adapted to such machines.

It will be noted that in the embodiment of FIG. 8, the plugs may not extend beyond the outer face of the header 10 so that the lower ledge 26'' of the container 26 may be in contact with the header face unless the distances between the tubes are such that the container ledge may contact the header face areas between the tubes.

Figure 11:
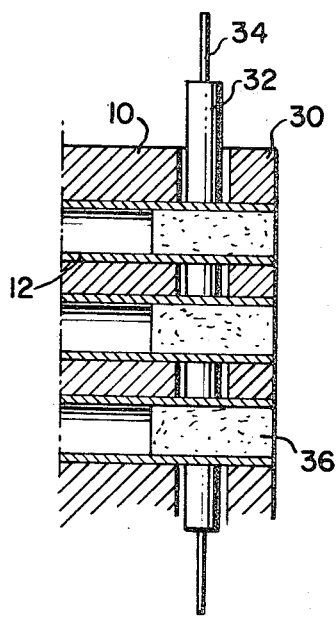
FIG. 11 is a section along line XI—XI of FIG. 12 and similar to FIG. 8, showing another embodiment of the process of surfacing.
Figure 12:
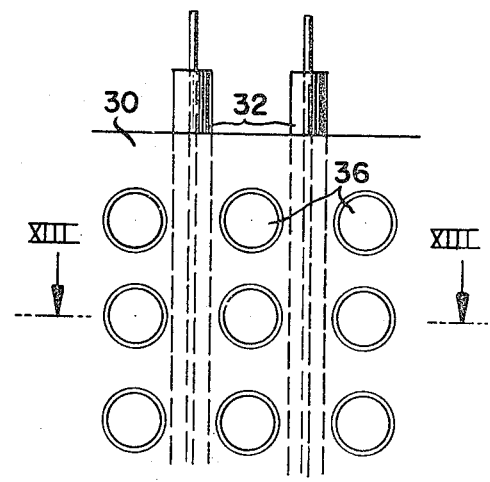
FIG. 12 is a top view of FIG. 11.
Figure 13:
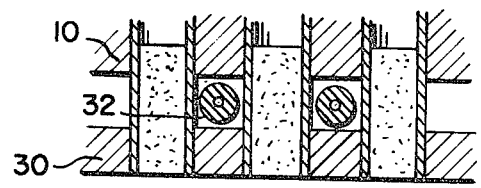
FIG. 13 is a section along line XIII—XIII of FIG. 12.

In the modification illustrated in FIGS. 11–13, a counter-plate 30 is used instead of container 26. The counter-plate, which is of the same or similar metal as the header, is positioned at a distance from the outer face of header 10 and has bores in registry with the bores in the header. The tubes 12 extend beyond the outer face of the header into the bores of the counter-plate, thus holding the same in position. As in all other embodiments, the outer ends of the tubes are closed by plugs 36 of any of the indicated types.

The header is so arranged that the outer face to be clad is vertical and the rows of tubes extend vertically. Between the rows of tubes and in the space between the outer face of the header and the counter-plate 30, there are placed the fusible welding rods 32 constituted by tubes through which pass the electrode wires 34, and which are insulated in the manner indicated hereinabove. At the periphery, the space between the outer face of the header and the counter-plate is closed by copper strips or other metal strips previously welded to the header and the counter-plate to hold the same in position and to provide a closed container for the weld bath. Thus, the closed space is filled with weld metal upon initiation of the welding process, and the weld metal surrounds the tubes 12 and joins them to the header while cladding the outer face thereof.

In any of the surfacing or cladding methods of the present invention, the plugs must be removed from the tubes after the welding operation has been completed and, if necessary, the tube ends must be reamed to remove any material obstructing the tube bores. When fusible metal plugs are used, the cladding layer must be pierced in alignment with the underlying bores of the tubes so as to remove this layer and the plug therebeneath. This may readily be done with the aid of a template having holes in registry with the bores of the outer face of the header.

Figure 14:
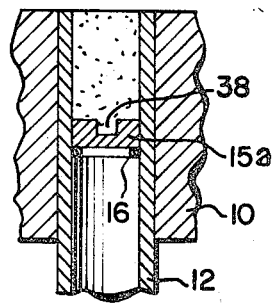
FIG. 14 is a sectional view of another embodiment.
Figure 15:
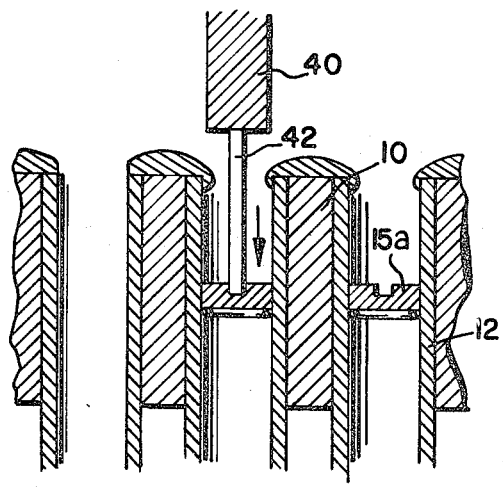
FIG. 15 is a similar view of yet another embodiment.

In case the plug consists of a mixture of flux and metal powder retained in position in the tube end by a metal disc 15a, as shown in FIGS. 14 and 15, the latter may be provided with a centering slot 38 coaxial with the axis of the tube. As shown in FIG. 15, after cladding, a drill 40 provided with a pilot rod 42 adapted to engage slot 38 may be inserted into the tube end to enable cladding metal extending into the tube bore to be removed. As the drill is pushed into the tube, it displaces the disc 15a towards the interior, and the same may be finally removed by injecting a fluid under pressure into the tube.

It will be noted that in the process shown in FIGS. 11–13, no special apparatus is needed for reaming the tube ends after cladding because the outer ends of the tubes are fixed to the counter-plate and remain accessible after the header has been surfaced or clad.

While the invention has been described in connection with certain now preferred embodiments, it will be clearly understood that many modifications and variations may occur to those skilled in the art, particularly after benefiting from the present teaching, without departing from the spirit and scope of this invention as defined in the appended claims.

I claim:

1. A process of joining a plurality of tubes to a header having an outer face and defining a corresponding plurality of bores having substantially the same diameters as the outer diameters of the tubes, comprising the steps of
    (a) inserting one end of the tubes into respective ones of the header bores, with said ends extending at least close to the outer header face;
    (b) plugging the ends of the tubes;
    (c) surfacing or cladding the outer header face by welding to join the tube ends to the header; and
    (d) unplugging the tube ends.

2. The process of claim 1, wherein said tube ends are substantially flush with the outer header face.

3. The process of claim 1, wherein said tube ends extend slightly beyond the outer header face.

4. The process of claim 1, wherein said tube ends extend slightly below the outer header face.

5. The process of claim 1, comprising the additional step of removing all obstructing material from the inner bores of the tubes at said ends after the surfacing or cladding.

6. The process of claim 1, wherein the tube ends are plugged by stoppers of a metal fusible under the conditions of welding.

7. The process of claim 1, wherein the tube ends are plugged by stoppers of a material which is not fusible under the conditions of welding.

8. The process of claim 7, wherein said material is a borosilicate glass.

9. The process of claim 1, wherein the tube ends are plugged by a welding material consisting of welding flux and metallic powder, and the welding material is retained at the tube ends by a disc held in the tube.

10. The process of claim 1, wherein the surfacing or cladding is applied by arc welding rectilinear, parallel welding strips between adjacent rows of said tube ends and in contact therewith.

11. The process of claim 1, wherein the surfacing or cladding is applied by welding under flux.

12. The process of claim 11, wherein the header is positioned with its outer face extending in a vertical direction, and adjacent welding strips are applied to the outer face of the header by supporting on the outer face a container for a weld metal and flux bath, the container having a lower ledge in contact with the outer header face and an upper edge in contact with a previously formed one of said welding strips, the welding strip being applied in said container between the ledge and the previously formed welding strip.

13. The process of claim 11, wherein a strip of the same thickness as that of the welding strips is affixed to the outer header surface adjacent a first row of said tube ends, and a first one of said welding strips is applied while holding the lower ledge of the container in contact with the surface and the upper container edge in contact with said strip.

14. The process of claim 11, wherein the tube ends extend beyond the outer header face into registering bores of a counter-plate, positioning said counter-plate at a distance from the outer header face to define a space between the outer header face and the counter-plate, and filling said space with weld metal to weld the surfacing or cladding on the outer header face under flux.

15. The process of claim 1, wherein the surfacing or cladding covers at least a portion of the bores of the tube, and including the further step of reaming any portion of said surfacing or cladding which obstructs said bores.

References Cited

UNITED STATES PATENTS

| | | | |
|---|---|---|---|
| 1,860,969 | 5/1932 | True | 285—189 |
| 1,991,429 | 2/1935 | Straty | 285—286X |
| 2,164,629 | 7/1939 | Sibley | 165—178X |
| 2,482,687 | 9/1949 | Mueller et al. | 285—189X |
| 2,807,445 | 9/1957 | Gardner | 285—189X |
| 2,824,212 | 2/1958 | Roberts | 165—178X |
| 3,216,749 | 11/1965 | Summerfield | 29—471.1X |

JOHN F. CAMPBELL, Primary Examiner

R. B. LAZARUS, Assistant Examiner

U.S. Cl. X.R.

29—471.1, 488, 490; 138—89; 285—189, 286